United States Patent
Yamakawa

Patent Number: 5,596,452
Date of Patent: Jan. 21, 1997

[54] COLLIMATOR LENS SYSTEM

[75] Inventor: Hiromitsu Yamakawa, Saitama-ken, Japan

[73] Assignee: Fuji Photo Optical Co., Ltd., Saitama-ken, Japan

[21] Appl. No.: 538,650

[22] Filed: Oct. 4, 1995

[30] Foreign Application Priority Data

Oct. 17, 1994 [JP] Japan ..................... 6-249897

[51] Int. Cl.$^6$ ................ G02B 27/30; G02B 9/14
[52] U.S. Cl. ................ 359/641; 359/362; 359/785
[58] Field of Search ................ 359/205–207, 359/215, 362, 642, 656, 661–663, 641, 689–690, 784–785, 218

[56] References Cited

U.S. PATENT DOCUMENTS

| | | | |
|---|---|---|---|
| 4,203,652 | 5/1980 | Hanada | 359/641 |
| 4,530,574 | 7/1985 | Scifres et al. | 359/641 |

FOREIGN PATENT DOCUMENTS 200206  11/1983  Japan .

OTHER PUBLICATIONS

English Abstract of the Japanese reference 58–200206.

*Primary Examiner*—Thong Nguyen
*Attorney, Agent, or Firm*—Sixbey Friedman Leedom & Ferguson; Gerald J. Ferguson, Jr.; Evan R. Smith

[57] ABSTRACT

A collimator lens system for collimating diverging light bundle emitted from a light source into a parallel light bundle includes first to third lens elements arranged in this order from the side of the parallel light bundle. The first lens to third elements are a positive double-convex lens, a negative lens concave to the side of the parallel light bundle and a positive lens convex to the side of the parallel light bundle, respectively. The following formulae (1) to (5) are satisfied $$0.8 < f_1/f_3 < 2.0 \tag{1}$$

$$1.5 < \{r_2(n_2-1)\}/\{r_3(n_1-1)\} < 2.7 \tag{2}$$

$$0.8 < r_5/\{f(n_3-1)\} < 1.4 \tag{3}$$

$$0.8 < -r_1/r_2 < 2.4 \tag{4}$$

$$0.5 < -f_2/f < 6.0 \tag{5}$$

wherein f represents the overall focal length of the collimator lens system, $f_i$ represents the focal length of i-th lens element, i standing for 1, 2 or 3, $r_i$ represents the radius of curvature of i-th refracting surface as numbered from the side of the parallel light bundle, i standing for 1, 2, 3, 4, 5 or 6 and $n_i$ represents the refractive index of i-th lens, i standing for 1, 2 or 3.

1 Claim, 2 Drawing Sheets

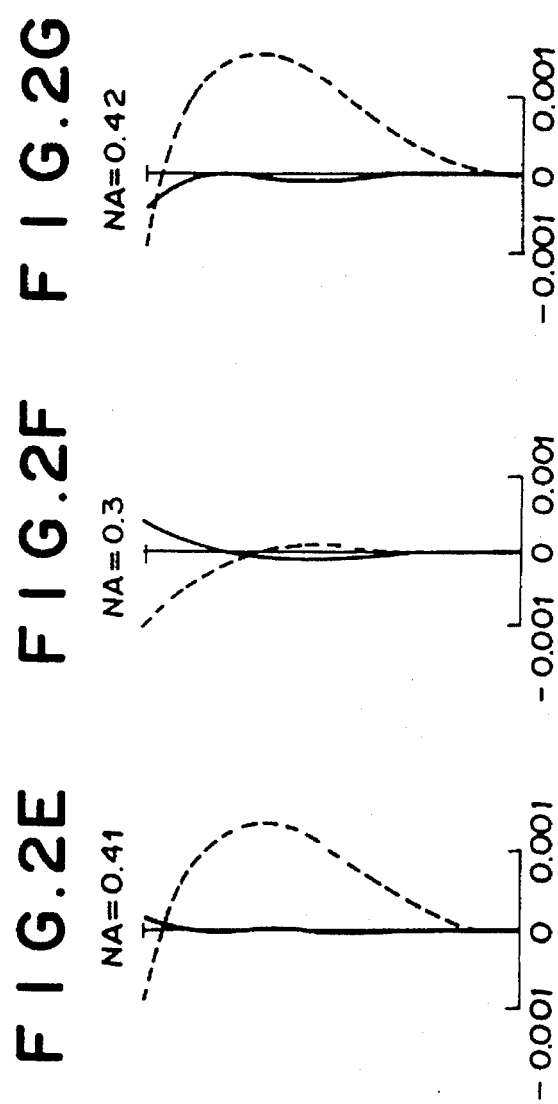

COLLIMATOR LENS SYSTEM

BACKGROUND OF THE INVENTION

1. Field of the Invention

This invention relates to a collimator lens system, and more particularly to a collimator lens system comprising three lens elements in three lens groups for collimating light rays emitted from a small light source like a semiconductor laser into parallel light rays for use, for instance, in a laser printer.

2. Description of the Related Art

Because of its easiness to control and small size, there has been an increasing demand for a laser diode as a light source for light communication, digital audio disks, laser printer and the like.

Since light rays emitted from the laser diode conically diverge, a collimator lens is generally disposed near the laser diode to once collimate the light rays into parallel rays. The collimator lens for such an application should be sufficiently corrected in spherical aberration so that diverging light rays emitted from a very small light source into parallel rays having a sufficient parallelism. Preferably the collimator lens has a large numerical aperture. As a collimator lens satisfying such requirements, there has been known a collimator lens disclosed in Japanese Unexamined Patent Publication No. 58(1983)-200206 which comprises four lens elements in four groups.

There has been a demand for a collimator lens which is simple in structure, and accordingly is easy to manufacture and can be manufactured at low cost.

When the collimator lens is mounted on a light source such as a laser diode, alignment of the lens with the light source can fluctuates due to manufacturing errors, and if the lens performance greatly deteriorates due to fluctuation in the alignment, value of the product deteriorates. However if adjustment of the alignment must be effected with a high accuracy, much labor is required, which adds to the manufacturing cost.

SUMMARY OF THE INVENTION

In view of the foregoing observations and description, the primary object of the present invention is to provide a collimator lens system which is simple in structure, large in numerical aperture and excellent in performance and at the same time can be easy to manufacture.

In accordance with the present invention, there is provided a collimator lens system for collimating diverging light bundle emitted from a light source into a parallel light bundle comprising first to third lens elements arranged in this order from the side of the parallel light bundle, the first lens element being a positive double-convex lens, the second lens element being a negative lens concave to the side of the parallel light bundle, the third lens element being a positive lens convex to the side of the parallel light bundle, and the following formulae (1) to (5) being satisfied $$0.8 < f_1/f_3 < 2.0 \quad (1)$$

$$1.5 < \{r_2(n_2-1)\}/\{r_3(n_1-1)\} 2.7 \quad (2)$$

$$0.8 < r_5/\{f(n_3-1)\} < 1.4 \quad (3)$$

$$0.8 < -r_1/r_2 < 2.4 \quad (4)$$

$$0.5 < -f_2/f < 6.0 \quad (5)$$

wherein f represents the overall focal length of the collimator lens system, $f_i$ represents the focal length of i-th lens element, i standing for 1, 2 or 3, $r_i$ represents the radius of curvature of i-th refracting surface as numbered from the side of the parallel light bundle, i standing for 1, 2, 3, 4, 5 or 6 and $n_i$ represents the refractive index of i-th lens, i standing for 1, 2 or 3.

In this specification, the radius of curvature of a refracting surface is a positive value when the refracting surface is convex to the side of the parallel light bundle and a negative value when the refracting surface is concave to the side of the parallel light bundle. That is, when the refracting surface is the parallel light bundle side face of a lens element, the radius of curvature is positive when the face is convex and negative when the face is concave. On the other hand, when the refracting surface is the light source side face of a lens element, the radius of curvature is positive when the face is concave and negative when the face is convex.

The term "the side of the parallel light bundle" means the side of the collimator lens system from which a light bundle emitted from the light source emanates as a parallel light bundle, that is, the side remote from the light source.

The collimator lens system of the present invention may be used as an objective lens which focuses an object.

Since the collimator lens system of this invention comprises only three lens elements, it is simpler in structure than the conventional collimator lens system which comprises four lens elements. Further when formulae (1) to (5) are satisfied, the numerical aperture can be about 0.3 or more and at the same time the following result can be obtained.

That is, formula (1) limits the ratio ($f_1/f_3$) of the focal length $f_1$ of the first lens element to the focal length $f_3$ of the third lens element and when the formula (1) is satisfied, the sine condition can be excellent and accordingly setting of the optical axis to the light source (alignment adjustment) is facilitated. Further since influence of high-order aberrations is reduced, lens processing is facilitated. Further the back focal length can be within a practical range, whereby positioning of the collimator lens system relative to the light source is facilitated. When the sine condition is excellent, coma does not greatly deteriorate even if the optical axis is shifted relative to the light source, whereby manufacture of the collimator lens system is facilitated.

When $f_1/f_3$ is not smaller than 2.0 or not larger than 0.8, the sine condition deteriorates and since even a slight shift of the optical axis from the light source greatly deteriorates coma, a very high accuracy in assembly is required, which makes difficult manufacture of the collimator lens system. Further increase in influence of high-order aberrations requires highly accurate lens processing and the back focal length is shortened to make difficult positioning of the collimator lens system relative to the light source.

Formula (2) limits the ratio ($r_2/r_3$) of the radius of curvature $r_2$ of the light source side face of the first lens element to the radius of curvature $r_3$ of the parallel light bundle side face of the second lens element taking into account the refractive indexes $n_1$ and $n_2$ of the respective lens elements. When $\{r_2(n_2-1)\}/\{r_3(n_1-1)\}$ is not smaller than 2.7, the sine condition deteriorates and a very high accuracy in assembly is required, which makes difficult manufacture of the collimator lens system. When $\{r_2(n_2-1)\}/\{r_3(n_1-1)\}$ is not larger than 1.5, the sine condition also deteriorates and a very high accuracy in assembly is required, and at the same time, increase in influence of high-order aberrations requires highly accurate lens processing. Further spherical aberration cannot be well corrected.

Formula (3) limits the ratio of the radius of curvature $r_5$ of the parallel light bundle side face of the third lens element to the overall focal length f of the collimator lens system taking into account the refractive index $n_3$ of the third lens element. When $r_5/\{f(n_3-1)\}$ is not smaller than 1.4, the sine condition deteriorates and a very high accuracy in assembly is required, and at the same time, spherical aberration cannot be well corrected. When $r_5/\{f(n_3-1)\}$ is not larger than 0.8, the sine condition deteriorates and influence of high-order aberrations increases. Accordingly a very high accuracy in assembly and highly accurate parts processing are required. Further the back focal length is shortened to make difficult positioning of the collimator lens system relative to the light source. At the same time, the radius of curvature $r_5$ of the parallel light bundle side face of the third lens element becomes too small, which makes lens processing further difficult.

Formula (4) limits the ratio of the radius of curvature $r_1$ of the parallel light bundle side face of the first lens element to the radius of curvature $r_2$ of the light source side face of the first lens element. When $-r_1/r_2$ is not smaller than 2.4, the sine condition deteriorates and influence of high-order aberrations increases. Accordingly a very high accuracy in assembly and highly accurate parts processing are required. When $-r_1/r_2$ is not larger than 0.8, the sine condition also deteriorates and a very high accuracy in assembly is required.

Formula (5) limits the ratio of the focal length $f_2$ of the second lens element to the overall focal length f of the collimator lens system. When the ratio $f_2/f$ is smaller than 6.0, the sine condition deteriorates and a very high accuracy in assembly is required, and at the same time, spherical aberration cannot be well corrected. When the ratio $f_2/f$ is not larger than 0.5, the sine condition deteriorates and influence of high-order aberrations increases. Accordingly a very high accuracy in assembly and highly accurate parts processing are required.

BRIEF DESCRIPTION OF THE DRAWINGS

FIGS. 2A to 2G are views respectively showing the sine condition and the spherical aberration of the collimator lens systems in accordance with first to seventh embodiments of the present invention.

DESCRIPTION OF THE PREFERRED EMBODIMENT

Figure 1:
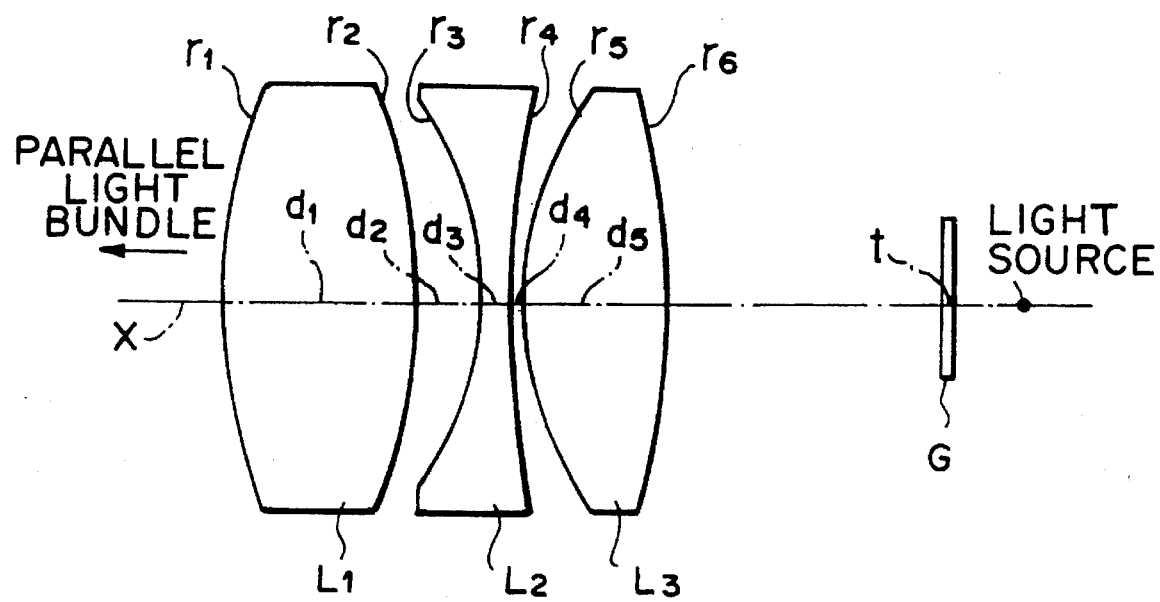
FIG. 1 is a schematic cross-sectional view showing the basic arrangement of the collimator lens system in accordance with the present invention.

FIG. 1 shows the arrangement of lens elements in collimator lens systems in accordance with first to seventh embodiments of the present invention. As shown in FIG. 1, each collimator lens system comprises first to third lens elements $L_1$ to $L_3$ in three groups arranged in this order from the parallel light bundle side (from the left in FIG. 1). The first lens element $L_1$ is a positive double-convex lens, the second lens element $L_2$ is a negative lens concave to the parallel light bundle side and the third lens element $L_3$ is a positive lens convex to the parallel light bundle side. The following formulae (1) to (5) are satisfied $$0.8 < f_1/f_3 < 2.0 \tag{1}$$

$$1.5 < \{r_2(n_2-1)\}/\{r_3(n_1-1)\} 2.7 \tag{2}$$

$$0.8 < r_5/\{f(n_3-1)\} < 1.4 \tag{3}$$

$$0.8 < -r_1/r_2 < 2.4 \tag{4}$$

$$0.5 < -f_2/f < 6.0 \tag{5}$$

wherein f represents the overall focal length of the collimator lens system, $f_i$ represents the focal length of i-th lens element, i standing for 1, 2 or 3, $r_i$ represents the radius of curvature of i-th refracting surface as numbered from the side of the parallel light bundle, i standing for 1, 2, 3, 4, 5 or 6 (being a positive value when the refracting surface is convex to the side of the parallel light bundle and a negative value when the refracting surface is concave to the side of the parallel light bundle) and $n_i$ represents the refractive index of i-th lens, i standing for 1, 2 or 3.

When formulae (1) to (5) are satisfied, the numerical aperture can be relatively large and at the same time the sine condition can be excellent. Accordingly coma does not greatly deteriorate even if the optical axis is shifted relative to the light source and setting of the optical axis to the light source (alignment adjustment) is facilitated. Further when the formulae (1) and (3) are satisfied, the back focal length can be within a practical range, whereby positioning of the collimator lens system relative to the light source is facilitated. When the formula (3) is satisfied, the radius of curvature $r_5$ of the parallel light bundle side face of the third lens $L_3$ may not be so small and accordingly lens processing is facilitated. Further when the formulae (2), (3) and (5) are satisfied, spherical aberration can be well corrected.

In FIG. 1, G denotes a window of the laser diode (perpendicular to the optical axis X) and t denotes the thickness of the window G.

First Embodiment

The radii of curvature r of the refracting surfaces, the axial surface separations d (the central thicknesses of the lens elements or the air separations) and the refractive indexes n of the lens elements in the collimator lens system in accordance with a first embodiment of the present invention are as shown in the following table 1. In table 1, the radii of curvature r, the axial surface separations d and the refractive indexes n are designated in order from the parallel light bundle side at $r_1$ to $r_6$, $d_1$ to $d_5$ and $n_1$ to $n_3$, respectively. The radii of curvature r, the axial surface separations d and the thickness t of the window G of the laser diode are in the values standardized on the basis of the overall focal length f (=1) of the collimator lens system. (The same for all the embodiments)

TABLE 1

| r | d | n |
|---|---|---|
| $r_1 = 0.9264$ | $d_1 = 0.3343$ | $n_1 = 1.61333$ |
| $r_2 = -0.9264$ | $d_2 = 0.1067$ | |
| $r_3 = -0.5615$ | $d_3 = 0.0571$ | $n_2 = 1.76593$ |
| $r_4 = 2.2784$ | $d_4 = 0.0143$ | |
| $r_5 = 0.6020$ | $d_5 = 0.0239$ | $n_3 = 1.61333$ |
| $r_6 = -1.3981$ | | | f = 1.0, NA = 0.3, t = 0.0119, λ = 780 nm
(1) $f_1/f_3 = 1.128$
(2) $r_2(n_2 - 1)/\{r_3(n_1 - 1)\} = 2.060$
(3) $r_5/\{f(n_3 - 1)\} = 0.982$
(4) $-r_1/r_2 = 1.000$
(5) $-f_2/f = 0.583$

FIG. 2A shows the spherical aberration (the solid line) and the sine condition (the broken line) at 780 nm of the collimator lens system of the first embodiment as the collimator lens system is regarded as a focusing lens system for focusing a light bundle from the parallel light bundle side. As can be understood from FIG. 2A, the collimator lens system of this embodiment is excellent in both the spherical aberration and the sine condition though it is very simple in structure and the numeric aperture NA is relatively large (NA=0.3). Thus the collimator lens system of this embodiment is easy to manufacture.

Second Embodiment

The radii of curvature r of the refracting surfaces, the axial surface separations d (the central thicknesses of the lens elements or the air separations) and the refractive indexes n of the lens elements in the collimator lens system in accordance with a second embodiment of the present invention are as shown in the following table 2. In table 2, the radii of curvature r, the axial surface separations d and the refractive indexes n are designated in order from the parallel light bundle side at $r_1$ to $r_6$, $d_1$ to $d_5$ and $n_1$ to $n_3$, respectively.

TABLE 2

| r | d | n |
|---|---|---|
| $r_1 = 1.4895$ | $d_1 = 0.1997$ | $n_1 = 1.61333$ |
| $r_2 = -0.8658$ | $d_2 = 0.0767$ | |
| $r_3 = -0.6523$ | $d_3 = 0.0830$ | $n_2 = 1.76593$ |
| $r_4 = \infty$ | $d_4 = 0.0160$ | |
| $r_5 = 0.6775$ | $d_5 = 0.0198$ | $n_3 = 1.61333$ |
| $r_6 = -3.0441$ | | | f = 1.0, NA = 0.3, t = 0.0083, λ = 780 nm
(1) $f_1/f_3 = 1.000$
(2) $r_2(n_2 - 1)/\{r_3(n_1 - 1)\} = 1.658$
(3) $r_5/\{f(n_3 - 1)\} = 1.105$
(4) $-r_1/r_2 = 1.720$
(5) $-f_2/f = 0.852$

In this embodiment, the light source side face of the second lens element $L_2$ is flat ($r_4=\infty$).

FIG. 2B shows the spherical aberration (the solid line) and the sine condition (the broken line) at 780 nm of the collimator lens system of the second embodiment as the collimator lens system is regarded as a focusing lens system for focusing a light bundle from the parallel light bundle side. As can be understood from FIG. 2B, the collimator lens system of this embodiment is excellent in both the spherical aberration and the sine condition though it is very simple in structure and the numeric aperture NA is relatively large (NA=0.3). Thus the collimator lens system of this embodiment is easy to manufacture.

Third Embodiment

The radii of curvature r of the refracting surfaces, the axial surface separations d (the central thicknesses of the lens elements or the air separations) and the refractive indexes n of the lens elements in the collimator lens system in accordance with a third embodiment of the present invention are as shown in the following table 3. In table 3, the radii of curvature r, the axial surface separations d and the refractive indexes n are designated in order from the parallel light bundle side at $r_1$ to $r_6$, $d_1$ to $d_5$ and $n_1$ to $n_3$, respectively.

TABLE 3

| r | d | n |
|---|---|---|
| $r_1 = 1.3556$ | $d_1 = 0.2304$ | $n_1 = 1.61657$ |
| $r_2 = -1.3556$ | $d_2 = 0.1312$ | |
| $r_3 = -0.9100$ | $d_3 = 0.0792$ | $n_2 = 1.79413$ |
| $r_4 = 7.0417$ | $d_4 = 0.0084$ | |
| $r_5 = 0.5782$ | $d_5 = 0.2648$ | $n_3 = 1.61657$ |
| $r_6 = 3.2039$ | | |

TABLE 3-continued f = 1.0, NA = 0.33, t = 0.0066, λ = 675 nm
(1) $f_1/f_3 = 1.031$
(2) $r_2(n_2 - 1)/\{r_3(n_1 - 1)\} = 1.919$
(3) $r_5/\{f(n_3 - 1)\} = 0.938$
(4) $-r_1/r_2 = 1.000$
(5) $-f_2/f = 1.010$ In this embodiment, the light source side face of the third lens element $L_3$ ($r_6$) is concave (convex to the parallel light bundle side).

FIG. 2C shows the spherical aberration (the solid line) and the sine condition (the broken line) at 675 nm of the collimator lens system of the third embodiment as the collimator lens system is regarded as a focusing lens system for focusing a light bundle from the parallel light bundle side. As can be understood from FIG. 2C, the collimator lens system of this embodiment is excellent in both the spherical aberration and the sine condition though it is very simple in structure and the numeric aperture NA is relatively large (NA=0.33). Thus the collimator lens system of this embodiment is easy to manufacture.

Fourth Embodiment

The radii of curvature r of the refracting surfaces, the axial surface separations d (the central thicknesses of the lens elements or the air separations) and the refractive indexes n of the lens elements in the collimator lens system in accordance with a fourth embodiment of the present invention are as shown in the following table 4. In table 4, the radii of curvature r, the axial surface separations d and the refractive indexes n are designated in order from the parallel light bundle side at $r_1$ to $r_6$, $d_1$ to $d_5$ and $n_1$ to $n_3$, respectively.

TABLE 4

| r | d | n |
|---|---|---|
| $r_1 = 3.4887$ | $d_1 = 0.5089$ | $n_1 = 1.63079$ |
| $r_2 = -1.7664$ | $d_2 = 0.1111$ | |
| $r_3 = -0.9662$ | $d_3 = 0.3356$ | $n_2 = 1.76593$ |
| $r_4 = -1.7778$ | $d_4 = 0.0578$ | |
| $r_5 = 0.9560$ | $d_5 = 0.7111$ | $n_3 = 1.76593$ |
| $r_6 = -6.8167$ | | | f = 1.0, NA = 0.35, t = 0.0556, λ = 780 nm
(1) $f_1/f_3 = 1.694$
(2) $r_2(n_2 - 1)/\{r_3(n_1 - 1)\} = 2.220$
(3) $r_5/\{f(n_3 - 1)\} = 1.248$
(4) $-r_1/r_2 = 1.975$
(5) $-f_2/f = 3.367$

In this embodiment, the light source side face of the second lens element $L_2$ ($r_4$) is convex (concave to the parallel light bundle side).

FIG. 2D shows the spherical aberration (the solid line) and the sine condition (the broken line) at 780 nm of the collimator lens system of the fourth embodiment as the collimator lens system is regarded as a focusing lens system for focusing a light bundle from the parallel light bundle side. As can be understood from FIG. 2D, the collimator lens system of this embodiment is excellent in both the spherical aberration and the sine condition though it is very simple in structure and the numeric aperture NA is relatively large (NA=0.35). Thus the collimator lens system of this embodiment is easy to manufacture.

Fifth Embodiment

The radii of curvature r of the refracting surfaces, the axial surface separations d (the central thicknesses of the lens elements or the air separations) and the refractive indexes n of the lens elements in the collimator lens system in accordance with a fifth embodiment of the present invention are as shown in the following table 5. In table 5, the radii of curvature r, the axial surface separations d and the refractive indexes n are designated in order from the parallel light bundle side at $r_1$ to $r_6$, $d_1$ to $d_5$ and $n_1$ to $n_3$, respectively.

TABLE 5

| r | d | n |
| --- | --- | --- |
| $r_1 = 1.7749$ | $d_1 = 0.3322$ | $n_1 = 1.6133$ |
| $r_2 = -1.7749$ | $d_2 = 0.2444$ | |
| $r_3 = -0.9417$ | $d_3 = 0.2867$ | $n_2 = 1.76593$ |
| $r_4 = -2.3947$ | $d_4 = 0.1111$ | |
| $r_5 = 0.5556$ | $d_5 = 0.4100$ | $n_3 = 1.61333$ |
| $r_6 = 3.1037$ | | | f = 1.0, NA = 0.41, t = 0.0333, λ = 780 nm
(1) $f_1/f_3 = 1.443$
(2) $r_2(n_2 - 1)/\{r_3(n_1 - 1)\} = 2.354$
(3) $r_5/\{f(n_3 - 1)\} = 0.906$
(4) $-r_1/r_2 = 1.000$
(5) $-f_2/f = 2.216$

In this embodiment, the light source side face of the second lens element $L_2$ ($r_4$) is convex (concave to the parallel light bundle side) and the light source side face the third lens element $L_3$ ($r_6$) is concave (convex to the parallel light bundle side).

FIG. 2E shows the spherical aberration (the solid line) and the sine condition (the broken line) at 780 nm of the collimator lens system of the fifth embodiment as the collimator lens system is regarded as a focusing lens system for focusing a light bundle from the parallel light bundle side. As can be understood from FIG. 2E, the collimator lens system of this embodiment is excellent in both the spherical aberration and the sine condition though it is very simple in structure and the numeric aperture NA is relatively large (NA=0.41). Thus the collimator lens system of this embodiment is easy to manufacture.

Sixth Embodiment

The radii of curvature r of the refracting surfaces, the axial surface separations d (the central thicknesses of the lens elements or the air separations) and the refractive indexes n of the lens elements in the collimator lens system in accordance with a sixth embodiment of the present invention are as shown in the following table 6. In table 6, the radii of curvature r, the axial surface separations d and the refractive indexes n are designated in order from the parallel light bundle side at $r_1$ to $r_6$, $d_1$ to $d_5$ and $n_1$ to $n_3$, respectively.

TABLE 6

| r | d | n |
| --- | --- | --- |
| $r_1 = 2.3114$ | $d_1 = 0.4327$ | $n_1 = 1.63079$ |
| $r_2 = -2.3114$ | $d_2 = 0.0654$ | |
| $r_3 = -1.0497$ | $d_3 = 0.2500$ | $n_2 = 1.63079$ |
| $r_4 = -1.7939$ | $d_4 = 0.2423$ | |
| $r_5 = 0.7442$ | $d_5 = 0.4327$ | $n_3 = 1.63079$ |
| $r_6 = \infty$ | | | f = 1.0, NA = 0.3, t = 0.024, λ = 780 nm
(1) $f_1/f_3 = 1.611$
(2) $r_2(n_2 - 1)/\{r_3(n_1 - 1)\} = 2.202$
(3) $r_5/\{f(n_3 - 1)\} = 1.180$
(4) $-r_1/r_2 = 1.000$
(5) $-f_2/f = 4.610$

In this embodiment, the light source side face of the second lens element $L_2$ ($r_4$) is convex (concave to the parallel light bundle side) and the light source side face the third lens element $L_3$ ($r_6$) is flat.

FIG. 2F shows the spherical aberration (the solid line) and the sine condition (the broken line) at 780 nm of the collimator lens system of the sixth embodiment as the collimator lens system is regarded as a focusing lens system for focusing a light bundle from the parallel light bundle side. As can be understood from FIG. 2F, the collimator lens system of this embodiment is excellent in both the spherical aberration and the sine condition though it is very simple in structure and the numeric aperture NA is relatively large (NA=0.3). Thus the collimator lens system of this embodiment is easy to manufacture.

Seventh Embodiment

The radii of curvature r of the refracting surfaces, the axial surface separations d (the central thicknesses of the lens elements or the air separations) and the refractive indexes n of the lens elements in the collimator lens system in accordance with a seventh embodiment of the present invention are as shown in the following table 7. In table 7, the radii of curvature r, the axial surface separations d and the refractive indexes n are designated in order from the parallel light bundle side at $r_1$ to $r_6$, $d_1$ to $d_5$ and $n_1$ to $n_3$, respectively.

TABLE 7

| r | d | n |
| --- | --- | --- |
| $r_1 = 1.6280$ | $d_1 = 0.3311$ | $n_1 = 1.58254$ |
| $r_2 = -1.6280$ | $d_2 = 0.2444$ | |
| $r_3 = -0.8756$ | $d_3 = 0.2867$ | $n_2 = 1.76593$ |
| $r_4 = -2.2112$ | $d_4 = 0.1111$ | |
| $r_5 = 0.5553$ | $d_5 = 0.4096$ | $n_3 = 1.58254$ |
| $r_6 = 6.0624$ | | | f = 1.0, NA = 0.42, t = 0.0185, λ = 780 nm
(1) $f_1/f_3 = 1.421$
(2) $r_2(n_2 - 1)/\{r_3(n_1 - 1)\} = 2.445$
(3) $r_5/\{f(n_3 - 1)\} = 0.953$
(4) $-r_1/r_2 = 1.000$
(5) $-f_2/f = 2.087$

In this embodiment, the light source side face of the second lens element $L_2$ ($r_4$) is convex (concave to the parallel light bundle side) and the light source side face the third lens element $L_3$ ($r_6$) is concave (convex to the parallel light bundle side).

FIG. 2G shows the spherical aberration (the solid line) and the sine condition (the broken line) at 780 nm of the collimator lens system of the seventh embodiment as the collimator lens system is regarded as a focusing lens system for focusing a light bundle from the parallel light bundle side. As can be understood from FIG. 2G, the collimator lens system of this embodiment is excellent in both the spherical aberration and the sine condition though it is very simple in structure and the numeric aperture NA is relatively large (NA=0.42). Thus the collimator lens system of this embodiment is easy to manufacture.

What is claimed is:

1. A collimator lens system for collimating diverging light bundle emitted from a light source into a parallel light bundle comprising first to third lens elements arranged in this order from the side of the parallel light bundle, the first lens element being a positive double-convex lens, the second lens element being a negative lens concave to the side of the parallel light bundle, the third lens element being a positive lens convex to the side of the parallel light bundle, and the following formulae (1) to (5) being satisfied $$0.8 < f_1/f_3 < 2.0 \tag{1}$$

$$1.5 < \{r_2(n_2-1)\}/\{r_3(n_1-1)\} 2.7 \tag{2}$$

$$0.8 < r_5/\{f(n_3-1)\} < 1.4 \tag{3}$$

$$0.8 < -r_1/r_2 < 2.4 \tag{4}$$

$$0.5 < -f_2/f < 6.0 \tag{5}$$

wherein f represents the overall focal length of the collimator lens system, $f_i$ represents the focal length of i-th lens element, i standing for 1, 2 or 3, $r_i$ represents the radius of curvature of i-th refracting surface as numbered from the side of the parallel light bundle, i standing for 1, 2, 3, 4, 5 or 6 (being a positive value when the refracting surface is convex to the side of the parallel light bundle and a negative value when the refracting surface is concave to the side of the parallel light bundle) and $n_i$ represents the refractive index of i-th lens, i standing for 1, 2 or 3.

* * * * *